Dec. 26, 1961 L. S. BARKSDALE 3,014,499
ROTARY VALVE
Filed Feb. 24, 1959 2 Sheets-Sheet 1
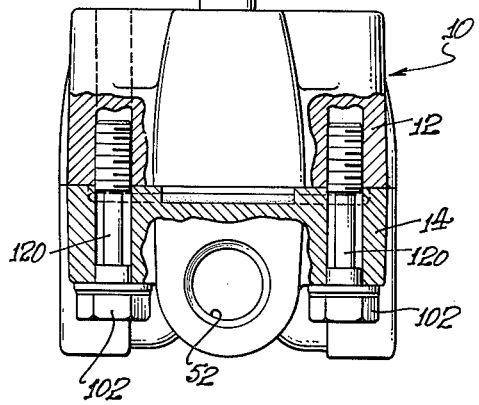
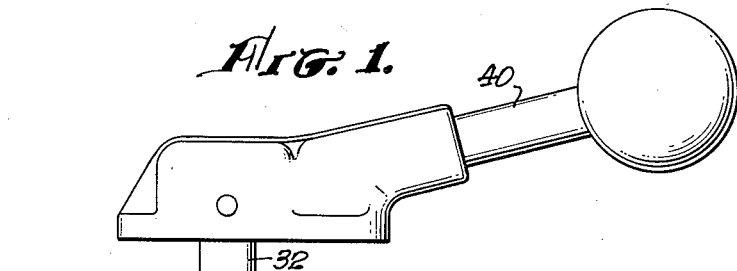
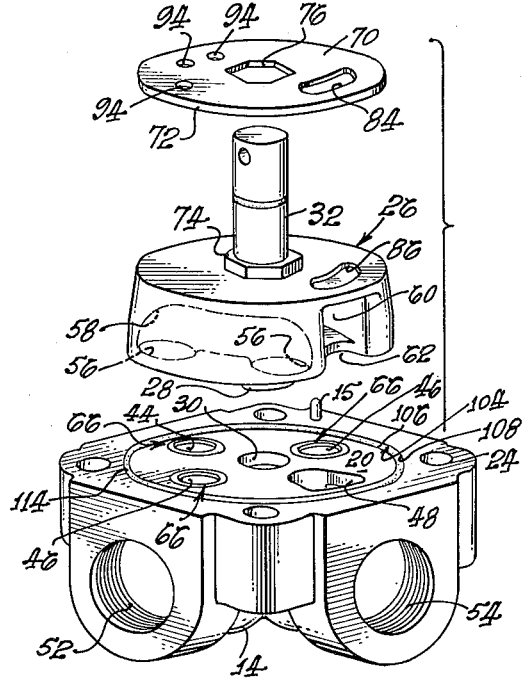
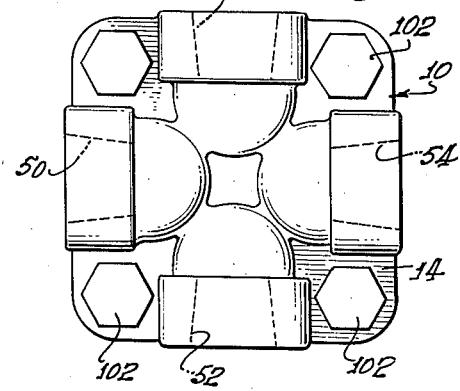
LILBURN S. BARKSDALE,
INVENTOR.
BY HIS ATTORNEYS
HARRIS, KIECH, RUSSELL & KERN Dec. 26, 1961  L. S. BARKSDALE  3,014,499
ROTARY VALVE
Filed Feb. 24, 1959  2 Sheets-Sheet 2
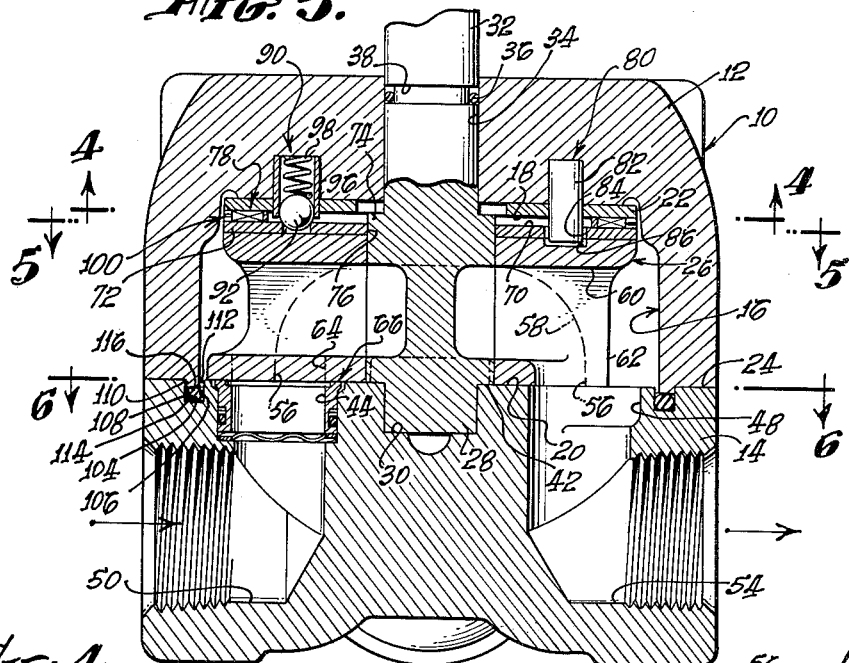
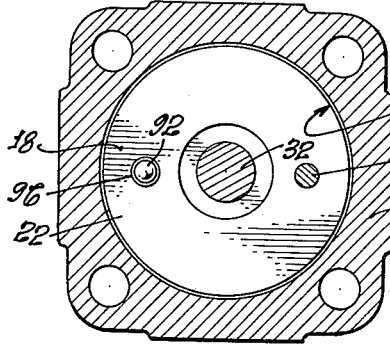
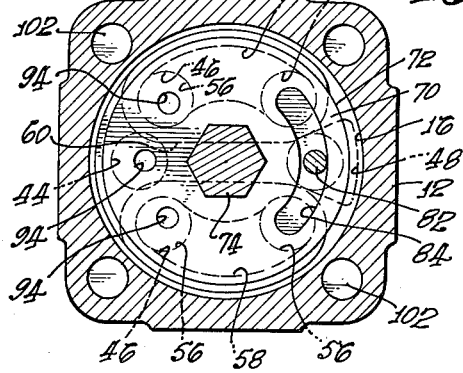
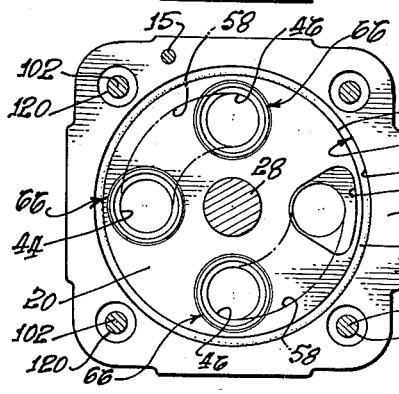
LILBURN S. BARKSDALE,
INVENTOR.
BY HIS ATTORNEYS.
Harris, Kiech, Russell & Kern.

_United States Patent Office_

3,014,499
Patented Dec. 26, 1961

3,014,499
ROTARY VALVE
Lilburn S. Barksdale, 6006 S. Mansfield,
Los Angeles 43, Calif.
Filed Feb. 24, 1959, Ser. No. 795,052
2 Claims. (Cl. 137—624)

The present invention relates in general to valves and, more particularly, to a rotary valve comprising a rotor having a ported end wall adjacent a ported end wall of a rotor chamber and having an opposed, unported end wall separated from an opposed, unported end wall of the rotor chamber by a thrust bearing means.

A rotary valve of the foregoing type is disclosed in my Patent No. 2,696,219, granted December 7, 1954, and includes stop means for limiting the angular movement of the rotor and detent means for releasably locking the rotor in various angularly spaced positions within the range of angular movement permitted by the stop means. In the rotary valve of my prior patent, the stop means and the detent means are located externally of the housing in which the rotor chamber is formed so that foreign matter may enter these components and adversely affect the operation thereof, which is obviously undesirable.

A primary object of the present invention is to provide a rotary valve of the foregoing type wherein the detent means and the stop means mentioned are located internally of the housing to exclude foreign matter.

More particularly, an important object of the invention is to mount the elements of the detent means and the stop means within the rotor chamber on the unported end wall thereof so that they are entirely enclosed by the valve housing.

Another object of importance is to provide a two-part housing, divided in the plane of the ported end walls of the rotor and rotor chamber, wherein the two parts of the housing are joined in such a manner that excessive fluid pressure will blow out the seal between the parts to prevent damage to the housing, the seal, which is preferably an O-ring, thus acting as a pressure relief valve means, which is an important feature.

The foregoing objects, advantages, features and results of the present invention, together with various other objects, advantages, features and results thereof which will be evident to those skilled in the valve art in the light of this disclosure, may be attained with the exemplary embodiment of the invention described in detail hereinafter and illustrated in the accompanying drawings, in which:

FIG. 1 is a side elevation of a rotary valve which embodies the invention;

FIG. 2 is a bottom view of the valve;

FIG. 3 is an enlarged, longitudinal sectional view of the valve;

FIGS. 4, 5 and 6 are transverse sectional views on a reduced scale respectively taken along the arrowed lines 4—4, 5—5 and 6—6 of FIG. 3; and FIG. 7 is an exploded perspective view of portions of the valve.

Since the rotary valve of the present invention is basically similar to that disclosed in my aforementioned prior patent, the general structure of the valve will be described only briefly herein and the emphasis will be placed on the improvements over the prior valve.

In the drawings, the numeral 10 designates a valve housing which is divided into two parts 12 and 14 in the plane of FIG. 6. The housing parts 12 and 14 are properly oriented relative to each other in the angular sense by a locating pin 15. The housing part 12 is generally cup-shaped to provide between the two housing parts a rotor chamber 16 having spaced, parallel end walls 18 and 20. The end wall 18 is formed by a wear plate 22 which is secured to the housing part 12 in a manner to be described, and the end wall 20 is formed by an end surface 24 of the housing part 14.

Rotatable within the rotor chamber 16 about an axis perpendicular to the end walls 18 and 20 thereof is a rotor 26 having the form of a disc or plate. The rotor 26 is loosely mounted on a shaft 32 which projects from the housing 10 through a bore 34 in the housing part 12, an O-ring 36 in a groove 38 in the shaft providing a fluid-tight seal between the shaft and the housing part 12. The shaft 32 is provided with a hexagonal, or other noncircular, portion 74 which fits loosely into a complementary hole in the rotor 26 to key the two together, and the shaft also has a cylindrical boss 28 which is journaled in a complementary cavity 30 in the surface 24 of the housing part 14. The shaft 32 carries an operating handle 40 externally of the housing 10.

The rotor 26 is provided with an end wall 42 adjacent the end wall 20 of the rotor chamber 16 with a slight clearance therebetween. In the particular construction illustrated, the rotary valve of the invention is a four-way selector valve and the end wall 20 of the rotor chamber is provided therein with an inlet or pressure port 44, two operating ports 46 and a return or outlet port 48, the latter extending radially outwardly beyond the periphery of the rotor 26 so that it is open at all times. The pressure, operating and return ports 44, 46 and 48 respectively communicate with pressure, operating and return passages 50, 52 and 54 formed in the housing part 14, these passages being shown as internally threaded at their outer ends to permit connecting fluid lines thereto. It will be understood that the pressure passage 50 communicates with a source of fluid under pressure, such as a pump, not shown, while the return passage 54 may communicate with a reservoir, not shown, connected to the inlet of such pump. The two operating passages 52 are, of course, adapted to be connected to a device, not shown, to be controlled by the rotary valve of the invention.

The end wall 42 of the rotor 26 is provided therein with two pairs of ports 56 adapted to register with the ports 44, 46 and 48 in various patterns, each pair of ports 56 in the rotor being interconnected by a passage 58 therein. The ports 56 in the rotor 26 are so arranged that when the rotor is in a neutral position, the ports 56 do not register with any of the ports 44, 46 and 48. When the rotor 26 is turned to one side of its neutral position, one of the passages 58 connects the pressure port 44 to one of the operating ports 46 and the other passage 58 connects the other operating port 46 to the return port 48. The reverse situation exists when the rotor 26 is turned to an operating position on the other side of its neutral position.

The rotor 26 is provided with a diametrical passage 60 which communicates at one end with the return port 48 when the rotor is in its neutral position, the rotor being cut away, as indicated at 62, to permit such communication. If it is desired to have an "open center" valve, i.e., one in which the fluid under pressure flows from the pressure port 44 to the return port 48 when the rotor 26 is in its neutral position, instead of being cut off, the rotor may be provided with a port 64, shown in phantom, which communicates with the diametrical passage 60 and which registers with the pressure port 44 when the rotor is in its neutral position.

The pressure and operating ports 44 and 46 in the end wall 20 of the rotor chamber 16 are surrounded by spring-biased tubular seals 66 which engage the end wall 42 of the rotor 26 and which provide fluid-tight seals around the ports in the end wall 42 of the rotor when in register therewith. The seals 66 are fully described in my aforementioned patent so that any further description herein is unnecessary.

The rotor 26 is provided with an end wall 70 which is spaced from and parallel to the end wall 18 of the rotor chamber 16, the end wall 70 being formed by a wear plate 72 which is suitably secured to the shaft 32. In the construction illustrated, the hexagonal portion 74 of the shaft 32 fits into a complementary hole 76 in the wear plate 72 to key the wear plate to the shaft.

Disposed between and engaging the wear plates 22 and 72 is a thrust bearing means 78, shown as a roller bearing, which opposes the axial thrust developed by fluid pressure and by the spring-biased tubular seals 66.

Angular movement of the rotor 26 between its operating positions is limited by a stop means 80 comprising a stop pin 82 set in the housing part 12 and projecting through the wear plate 22 into an arcuate slot 84 in the wear plate 72 and into a registering arcuate groove 86 in the rotor 26. As will be apparent, angular movement of the rotor 26 is limited by engagement of the ends of the slots 84 and groove 86 with the stop pin 82. The stop pin 82 also serves to orient the rotor 26 properly relative to the housing part 12 to prevent assembly thereof angularly "out of phase."

The valve of the invention also includes a detent means 90 which releasably locks the rotor 26 in its neutral position and in each of its operating positions. The detent means 90 includes a ball detent 92 receivable in any one of three holes 94 in the wear plate 72, the holes 94 respectively corresponding to the neutral position and the two operating positions of the rotor 26. The ball detent 92 is retained and guided by being disposed within a sleeve 96 set in the housing part 12 and extending through the wear plate 22, this sleeve thus cooperating with the stop pin 82 to key the wear plate 22 in place. A compression coil spring 98 seated at one end against the housing part 12 and at its other end against the ball detent 92 biases the latter into engagement with the wear plate 72 and thus into the detent holes 94 therein.

It will be seen that the stop means 80 and the detent means 90 are disposed within the housing 10 so that they are shielded against entry of foreign matter from external sources, which is an important feature.

The thrust bearing means 78 is encircled by a suitable lubricant sealing means 100 and the stop means 80 and the detent means 90 are encircled by the thrust bearing means. Consequently, the thrust bearing means 78 and the detent means 90 may be pre-lubricated, the lubricant being retained by the sealing means 100. Since the thrust-bearing means 78, and the elements encircled thereby, are located between the end wall 70 of the rotor 26 and the end wall 18 of the rotor chamber 16, and are thus remote from the ported end walls 20 and 42, they are shielded from the fluid flow through the valve by the rotor and are located in a more or less dead zone of the rotor chamber insofar as flow is concerned. Consequently, fluid flow through the valve has little tendency to wash out the lubricant employed for the thrust bearing means 78 and the detent means 90.

The joint between the two housing parts 12 and 14, which are secured together by bolts 102, is sealed in a fluid-tight manner. Considering how this is accomplished, the end surface 24 of the housing part 14 is provided therein with an annular groove 104 which encircles the end wall 20 of the rotor chamber 16, this groove having radially spaced inner and outer walls 106 and 108. The housing part 14 is provided thereon with an annular skirt 110 which projects into the annular groove 104 and which engages the outer wall 108 thereof to center the two housing parts relative to each other. However, there is a gap 112 between the skirt 110 and the inner wall 106 of the groove 104. An O-ring 114 is disposed in the annular groove 104 and engages the walls thereof and the end wall 116 of the skirt 110 to provide a fluid-tight seal between the housing parts 12 and 14.

The O-ring 114 is intended to blow out of its groove 104 under excessive pressure to prevent damage to the housing 10. This is achieved by providing the bolts 102 with reduced-diameter portions 120 which stretch and/or break under excessive pressure to permit such pressure to blow the O-ring 114 out and dissipate.

Although an exemplary embodiment of the invention has been disclosed herein for purposes of illustration, it will be understood that the various minor changes, modifications and substitutions may be incorporated in such embodiment without departing from the spirit of the invention as defined by the claims which follow:

1. In a rotary valve, the combination of: a housing provided with a rotor chamber having spaced, parallel end walls, said housing being provided with spaced ports formed in one of said end walls of said rotor chamber; a rotor rotatable in said rotor chamber between angularly spaced positions about an axis perpendicular to said end walls of said rotor chamber, said rotor having an end wall parallel to and spaced from the other, unported end wall of said rotor chamber, and said rotor having a passage therein which connects said ports in one of said positions of said rotor; thrust bearing means in the space between and engaging said one end wall of said rotor and said unported end wall of said rotor chamber; detent means spanning said space between and carried by said one end wall of said rotor and said unported end wall of said rotor chamber for releasably locking said rotor in said positions; stop means spanning said space between and carried by said one end wall of said rotor and said unported end wall of said rotor chamber for limiting the angular movement of said rotor; and lubricant sealing means spanning said space between said one end wall of said rotor and said unported end wall of said rotor chamber and encircling said thrust bearing means, said detent means and said stop means.

2. A rotary valve as set forth in claim 1 wherein said thrust bearing means encircles said detent means and said stop means.

References Cited in the file of this patent

UNITED STATES PATENTS

| | | |
|---|---|---|
| 602,378 | Thomson | Apr. 12, 1898 |
| 1,394,072 | Egbert | Oct. 18, 1921 |
| 1,421,904 | Buehle et al. | July 4, 1922 |
| 1,669,700 | Egbert | May 15, 1928 |
| 2,202,961 | Parker | June 4, 1940 |
| 2,688,981 | Greer et al. | Sept. 14, 1954 |
| 2,696,219 | Barksdale | Dec. 7, 1954 |
| 2,736,339 | Asbury et al. | Feb. 28, 1956 |
| 2,923,318 | Monson | Feb. 2, 1960 |

FOREIGN PATENTS

| | | |
|---|---|---|
| 1,095,864 | France | June 7, 1955 |